United States Patent [19]

Newman et al.

[11] Patent Number: 5,512,643

[45] Date of Patent: Apr. 30, 1996

[54] PROCESS FOR PREPARATION OF SYNDIOCATIC VINYLIDENE AROMATIC POLYMERS USING REDUCED METAL CATALYSTS

[75] Inventors: Thomas H. Newman, Midland, Mich.; Karen K. Borodychuk, Mt. Pleasant, both of Mich.

[73] Assignee: The Dow Chemical Company, Midland, Mich.

[21] Appl. No.: 514,060

[22] Filed: Aug. 11, 1995

Related U.S. Application Data

[63] Continuation of Ser. No. 133,356, Oct. 8, 1993, abandoned.

[51] Int. Cl.$^6$ .................................. C08F 4/64; C08F 12/08
[52] U.S. Cl. ........................... 526/160; 526/132; 526/153; 526/161; 526/165
[58] Field of Search ..................................... 526/160, 165, 526/132, 161, 153

[56] References Cited

U.S. PATENT DOCUMENTS

| | | | |
|---|---|---|---|
| 4,680,353 | 7/1987 | Ishihara et al. | 526/160 |
| 5,066,741 | 11/1991 | Campbell, Jr. | 526/130 X |
| 5,340,892 | 8/1994 | Kuramoto | 526/119 |

FOREIGN PATENT DOCUMENTS

WO93/02584  9/1993  WIPO.

*Primary Examiner*—Fred Teskin

[57] ABSTRACT

A process for preparing syndiotactic vinylidene aromatic polymers comprising contacting one or more vinylidene aromatic monomers with a catalyst comprising a Group 4 metal complex in the +3 oxidation state and a polyalkylaluminoxane cocatalyst.

7 Claims, No Drawings

PROCESS FOR PREPARATION OF SYNDIOCATIC VINYLIDENE AROMATIC POLYMERS USING REDUCED METAL CATALYSTS

CROSS-REFERENCE TO RELATED APPLICATION

This is a continuation of application Ser. No. 08/133,356, filed Oct. 8, 1993, now abandoned.

BACKGROUND OF THE INVENTION

The present invention relates to a process for polymerizing vinylidene aromatic monomers, such as styrene, to produce polymers having a high degree of syndiotacticity using Group 4 metal catalysts wherein the metal is in the +3 oxidation state and an aluminoxane cocatalyst. Such polymers may be usefully employed in the preparation of solid objects and articles such as a moldings, films, sheets and foamed objects by molding, casting or the like process.

In U.S. Pat. No. 4,680,353 there is disclosed a process for the preparation of polymers of vinylidene aromatic monomers having a stereoregular structure of high syndiotacticity, by the use of Group 4 metal coordination catalysts in the +4 oxidation state and an aluminoxane cocatalyst.

In U.S. Pat. No. 5,066,741 there are disclosed certain cationic metal compounds formed by reacting a Group 4 metal complex including both +3 and +4 metal complexes with ammonium or phosphonium salts of Bronsted acids containing a non-coordinating compatible anion or with cationic oxidizers containing a non-coordinating compatible anion. The complexes are usefully employed as catalysts in the polymerization of polymers of vinylidene aromatic monomers having a stereoregular structure of high syndiotacticity.

In U.S. Ser. No. 08/008,003, filed Jan. 21, 1993, now U.S. Pat. No. 5,374,696 certain Group 4 metal complexes wherein the metal is in the +3 oxidation state and their use as addition polymerization catalysts are disclosed. For the teachings contained therein, the aforementioned U.S. Pat. Nos. 4,680,353 and 5,066,741 and U.S. Ser. No. 08/008,003 are herein incorporated in their entirety by reference thereto.

SUMMARY OF THE INVENTION

According to the present invention there is now provided a novel process for preparing polymers of vinylidene aromatic monomers having a high degree of syndiotacticity. The process comprises contacting at least one polymerizable vinylidene aromatic monomer under polymerization conditions with a catalyst comprising a Group 4 metal complex corresponding to the formula:

wherein:

Cp is a single $\eta^5$-cyclopentadienyl or $\eta^5$-substituted cyclopentadienyl group, the substituted cyclopentadienyl group being optionally also bonded to M through a substituent X;

M is a metal of Group 4 or the Lanthanide Series of the Periodic Table in the $^+3$ oxidation state;

X each occurrence is an inert anionic ligand of up to 20 nonhydrogen atoms and optionally X and Cp are joined together;

X' is an inert, neutral donor ligand;

m and p are independently 0 or 1;

n is an integer greater than or equal to 2; and the sum of m and n is 3; and a polyalkylaluminoxane activating cocatalyst.

Compared to similar catalysts based on complexes in the +4 oxidation state, the present process achieves a significantly improved conversion of monomer and efficiency in use, thereby permitting a reduction in the quantity of cocatalyst employed.

DETAILED DESCRIPTION OF THE INVENTION

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the term "syndiotactic" refers to polymers having a stereoregular structure of greater than 50 percent syndiotactic of a racemic triad as determined by $^{13}$C nuclear magnetic resonance spectroscopy. Such polymers may be usefully employed in the preparation of articles and objects (e.g., via compression molding, injection molding or other suitable technique) having an extremely high resistance to deformation due to the effects of temperature.

Illustrative but nonlimiting examples of X include hydrocarbyl, silyl, halo, $NR_2$, $PR_2$, OR, SR, and $BR_2$, wherein R is $C_{1-10}$ hydrocarbyl. Preferably where X and R are hydrocarbyl the same are σ-bonded groups.

Illustrative but nonlimiting examples of X' include ROR, RSR, $NR_3$, $PR_3$, and $C_{2-20}$ olefins or diolefins, wherein R is as previously defined. Such donor ligands are able to form shared electron bonds but not a formal covalent bond with the metal.

Suitable polyalkylaluminoxane activating cocatalysts (interchangeably referred to as aluminoxanes) for use herein especially include methylalumoxane, isopropyl aluminoxane, and modified methylaluminoxane, ie. methylaluminoxane modified with triisopropyl aluminum. In addition to the aluminoxane it is often desirable to additionally include a $C_{1-4}$ trialkyl aluminum compound in the polymerization. Examples include triethyl aluminum, tri n-propyl aluminum, tri isopropyl aluminum, tri n-butyl aluminum, tri isobutyl aluminum, and mixtures thereof.

Monocyclopentadienyl and substituted monocyclopentadienyl groups for use according to the present invention are more specifically depicted by the formula:

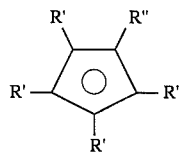

wherein:

R' each occurrence is independently selected from the group consisting of hydrogen, halogen, R, N—$R_2$, P—$R_2$; OR; SR or $BR_2$, wherein R is as previously defined, or one or two pairs of adjacent R' hydrocarbyl groups are joined together forming a fused ring system.

R" individually may be R' or a divalent X group that is also covalently bonded to M.

Preferably, R' is alkyl or haloalkyl of up to 6 carbons. Most highly preferably Cp is cyclopentadienyl or pentamethylcyclopentadienyl.

Illustrative, but not limiting examples of metal complexes which may be used in the preparation of the compounds of this invention are derivatives of titanium, zirconium, and hafnium. Titanium is the preferred metal. Most highly preferred metal complexes comprise cyclopentadienyl titanium $C_{1-4}$ dialkoxide or pentamethylcyclopentadienyltitanium $C_{1-4}$ dialkoxide.

In a highly preferred embodiment of the present invention Cp is $\eta^5$-cyclopentadienyl or $\eta^5$-pentamethylcyclopentadienyl, m is one, M is titanium, n is two, p is zero, X is R or OR, and R is $C_{1-10}$ alkyl, aryl or aralkyl.

The catalyst can be prepared in a suitable solvent at a temperature within the range from about −100° C. to about 300° C. The catalyst system can also form in situ if the components thereof are added directly to the polymerization process and a suitable solvent or diluent, including the monovinylidene aromatic monomer, is used in said polymerization process. It is preferred, however, to form the catalyst in a separate step in a suitable solvent prior to adding the same to the polymerization reactor. The catalyst components are generally sensitive to both moisture and oxygen and should be handled and transferred in an inert atmosphere such as nitrogen, argon or helium.

Suitable solvents or diluents for the catalyst preparation and for the polymerization include any of the solvents known in the prior art including, but not necessarily limited to, straight and branched-chain hydrocarbons such as $C_{6-12}$ alkanes (hexane, heptane, octane and the like); $C_{6-12}$ cyclic and alicyclic hydrocarbons such as cyclohexane, cycloheptane, methylcyclohexane, methylcycloheptane and the like and $C_{6-12}$ aromatic and alkyl-substituted aromatic compounds such as benzene, toluene, xylene, decalin, and the like, and mixtures thereof.

The catalysts may be employed as homogeneous catalysts or supported on the surface of a suitable support such as alumina, silica or a polymer.

In the practice of the present invention, suitable vinylidene aromatic monomers include those represented by the formula:

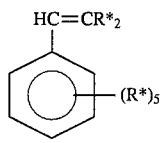

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butylstyrene, p-vinyltoluene, α-methylstyrene, etc., with styrene being especially suitable. Copolymers of styrene and the above vinylidene aromatic monomers other than styrene can also be prepared.

The polymerization may be conducted under slurry, bulk or suspension polymerization conditions or other suitable reaction conditions including solid, powdered reaction conditions. The polymerization can be conducted at temperatures of from 0° C. to 160° C., preferably from 25° C. to 100° C., more preferably from 30° C. to 80° C., for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa–3,400 kPa). The use of ambient or low pressures, e.g., 1–5 psig (6.9–34.5 kPa) is preferred in view of lower capital and equipment A.C.

The polymerization may be conducted in the presence of an inert diluent or solvent or in the absence thereof, i.e., in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-20}$ alkanes, toluene and mixtures thereof. A particularly desirable diluent for the polymerization is iso-octane, iso-nonane or blends thereof such as Isopar-E®, available from Exxon Chemical Company Suitable amounts of solvent are employed to provide a monomer concentration from 5 percent to 100 percent by weight.

The molar ratio of the vinylidene aromatic monomer to catalyst (in terms of M) may range from 100:1 to $1\times10^{10}$:1, preferably from 1000:1 to $1\times10^{6}$:1. If a trialkyl aluminum compound is additionally present the molar ratio of the vinylidene aromatic monomer to such compound is preferably from 100:1 to $1\times10^{8}$:1, preferably from 1000:1 to $1\times10^{6}$:1.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, etc. may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. Unless stated to the contrary, all parts and percentages are based on weight.

EXAMPLES 1–6

All reactions and manipulations were carried out under inert atmosphere in a dry box. Solvent and styrene monomer were purified by sparging with $N_2$ and passing through activated alumina and handled using standard inert atmosphere techniques.

Catalyst solutions were prepared in volumetric flasks using toluene solvent. The required amount of pentamethylcyclopentadienyltitanium dimethoxide (Cp*Ti(OCH$_3$)$_2$) was weighed and added to the flask and toluene added to form a 0.01 Molar solution.

Polymerizations were carried out in septum capped, crimp sealed ampoules. The ampoules were charged with 10 ml of styrene and various amounts of the cocatalyst polymethylaluminoxane (PMA). The catalyst solution was added and the ampoules were then sealed and equilibrated at 70° C. in a water bath. The polymerization was quenched by the addition of methanol after one hour polymerization time.

Each polymer sample was isolated and dried in order to determine the percent conversion. Molecular weight of the resulting syndiotactic polymer was determined via standard solution viscometry using atactic polystyrene standards. All polymers had melting points in excess of 260° C. consistent with tacticities of greater than 50 percent based on a racemic triad.

Results are shown in Table I.

TABLE I

| Ex. | Molar ratio Styrene:MAO:Ti | % Conversion |
|---|---|---|
| 1 | 233,333:25:1 | 10 |
| 2 | 233,333:50:1 | 32 |
| 3 | 233,333:100:1 | 55 |
| 4 | 233,333:200:1 | 63 |
| 5 | 233,333:300:1 | 62 |
| 6 | 233,333:500:1 | 61 |

The use of pentamethylcyclopentadienyltitanium (III) dimethoxide catalyst and methylaluminoxane cocatalyst is seen to be extremely effective for the polymerization of vinylidene aromatic monomers to prepare syndiotactic polymers therefrom.

Comparative 1–6

The reaction conditions of Example 1 were substantially repeated using pentamethylcyclopentadienyltitanium (IV) trimethoxide in place of pentamethylcyclopentadienyltitanium (III) dimethoxide. Results are contained in Table II.

TABLE II

| Ex. | Molar ratio Styrene:MAO:Ti | % Conversion |
|---|---|---|
| 1 | 233:333:25:1 | 2 |
| 2 | 233,333:50:1 | 22 |
| 3 | 233,333:100:1 | 33 |
| 4 | 233,333:200:1 | 41 |
| 5 | 233,333:300:1 | 40 |
| 6 | 233,333:500:1 | 37 |

The use of pentamethylcyclopentadienyltitanium (IV) trimethoxide catalyst is seen to result in reduced conversion of monomer compared to the use of pentamethylcyclopentadienyltitanium (III) dimethoxide catalyst.

EXAMPLES 7–13

The reaction conditions of Example 1 were substantially repeated using pentamethylcyclopentadienyltitanium (III) dimethoxide catalyst in combination with triisobutyl aluminum (TIBA) scavenging agent. Results are contained in Table III.

TABLE III

| Ex. | Molar ratio Styrene:MAO:TIBA:Ti | % Conversion |
|---|---|---|
| 7 | 233,333:200:0:1 | 58 |
| 8 | 233,333:200:3:1 | 60 |
| 9 | 233,333:200:6:1 | 62 |
| 10 | 233,333:200:10:1 | 64 |
| 11 | 233,333:200:20:1 | 66 |
| 12 | 233,333:200:50:1 | 66 |
| 13 | 233,333:200:100:1 | 68 |

Comparative 7–13

The reaction conditions of Examples 7–12 were substantially repeated using pentamethylcyclopentadienyltitanium (IV) trimethoxide catalyst in place of pentamethylcyclopentadienyltitanium (III) dimethoxide. Results are contained in Table IV.

TABLE III

| Ex. | Molar ratio Styrene:MAO:TIBA:Ti | % Conversion |
|---|---|---|
| 7 | 233,333:200:0:1 | 30 |
| 8 | 233,333:200:3:1 | 42 |
| 9 | 233,333:200:6:1 | 47 |
| 10 | 233,333:200:10:1 | 53 |
| 11 | 233,333:200:20:1 | 58 |
| 12 | 233,333:200:50:1 | 62 |
| 13 | 233,333:200:100:1 | 62 |

The use of pentamethylcyclopentadienyltitanium (IV) trimethoxide catalyst is again seen to result in reduced conversion of monomer compared to pentamethylcyclopentadienyltitanium (III) dimethoxide catalyst despite the presence of triisobutyl aluminum (TIBA) scavenging agent.

What is claimed is:

1. A process for preparing syndiotactic polymers of vinylidene aromatic monomers comprising contacting one or more vinylidene aromatic monomers under polymerization conditions with a catalytically effective amount of a catalyst comprising a metal complex corresponding to the formula:

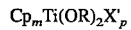

$$Cp_m Ti(OR)_2 X'_p$$

wherein:

Cp is a single η5-cyclopentadienyl or η5-substituted cyclopentadienyl group;

R is $C_{1-10}$ hydrocarbyl;

X' is an inert, neutral donor ligand; and p is 0 or 1;

and a polyalkylaluminoxane activating cocatalyst, the molar ratio of monovinylidene aromatic monomer: Ti being from 100:1 to $1 \times 10^{10}$:1 and the molar ratio of metal complex:polyalkylaluminoxane being from 1:100 to 1:500.

2. The process according to claim 1 wherein the vinylidene aromatic monomer is represented by the formula:

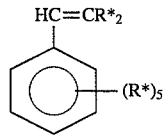

wherein each R* is independently hydrogen; an aliphatic, cycloaliphatic or aromatic hydrocarbon group having from 1 to 10 carbon atoms; or a halogen atom.

3. The process according to claim 2 wherein the vinylidene aromatic monomer is styrene.

4. The process according to claim 1 wherein Cp corresponds to the formula:

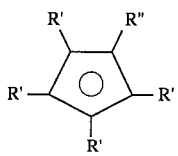

wherein:

R' R" each occurrence are independently selected from the group consisting of hydrogen, halogen, R, N—R$_2$, P—R$_2$; OR; SR or BR$_2$, wherein R is as previously defined in claim 1, or one or two pairs of adjacent R' hydrocarbyl groups are joined together forming a fused ring system.

5. The process according to claim 1 wherein Cp is $\eta^5$-cyclopentadienyl or $\eta^5$-pentamethylcyclopentadienyl, p is zero, and R is $C_{1-10}$ alkyl, aryl or aralkyl.

6. The process of claim 1 wherein the catalyst comprises a pentamethylcyclopentadienyltitanium $C_{1-4}$ dialkoxide or cyclopentadienyltitanium $C_{1-4}$ dialkoxide and the cocatalyst comprises methylaluminoxane.

7. The process of claim 6 wherein the catalyst comprises pentamethylcyclopentadienyltitanium dimethoxide and the cocatalyst comprises methylaluminoxane.

* * * * *